United States Patent
Olivares

(10) Patent No.: US 9,549,498 B2
(45) Date of Patent: Jan. 24, 2017

(54) SUPPLY LINE CONNECTING DEVICE IN A FOLDABLE AGRICULTURAL MACHINE

(71) Applicant: Deere & Company, Moline, IL (US)

(72) Inventor: Marco Antonio Olivares, Garza Garcia (MX)

(73) Assignee: DEERE & COMPANY, Moline, IL (US)

( * ) Notice: Subject to any disclaimer, the term of this patent is extended or adjusted under 35 U.S.C. 154(b) by 120 days.

(21) Appl. No.: 14/534,334

(22) Filed: Nov. 6, 2014

(65) Prior Publication Data

US 2016/0128264 A1     May 12, 2016

(51) Int. Cl.
*A01B 73/06*      (2006.01)
*A01B 73/00*      (2006.01)
*A01B 73/04*      (2006.01)

(52) U.S. Cl.
CPC ........... *A01B 73/005* (2013.01); *A01B 73/044* (2013.01); *A01B 73/06* (2013.01)

(58) Field of Classification Search
USPC ................................ 248/56, 74.1, 74.2, 74.3
See application file for complete search history.

(56) References Cited

U.S. PATENT DOCUMENTS

| | | | | |
|---|---|---|---|---|
| 2,078,453 A | * | 4/1937 | Miller ..................... | B60R 17/00 248/56 |
| 2,723,136 A | * | 11/1955 | Deubler .............. | F16L 27/0828 285/110 |
| 3,722,916 A | * | 3/1973 | Muntjanoff .............. | B60D 1/62 248/75 |
| 3,905,789 A | * | 9/1975 | Carpenter ............... | F25D 19/00 165/76 |
| 3,999,781 A | * | 12/1976 | Todd ..................... | F16L 15/008 285/12 |

(Continued)

FOREIGN PATENT DOCUMENTS

| | | |
|---|---|---|
| CH | 129967 A | 1/1929 |
| DE | 431260 A1 | 3/1985 |

(Continued)

OTHER PUBLICATIONS

European Search Report issued in counterpart application No. 14189854.4, dated Mar. 12, 2015 (4 pages).

(Continued)

*Primary Examiner* — Alicia Torres

(57) ABSTRACT

An agricultural machine comprises a first frame part and a second frame part pivotably arranged about a vertical shaft relative to the first frame part. At least one first supply line which extends along the first frame part and at least one second supply line which extends along the second frame part, wherein a connecting device connects the at least first supply line and the at least second supply line together. To prevent distortion of the supply lines when pivoting the frame parts relative to one another, the connecting device comprises a retainer on which at least one rigid pipe connection is arranged for connecting the first and second supply lines wherein the pipe connection comprises two connecting ends aligned axially relative to one another, between which a bearing disc is clamped, wherein the bearing disc is rotatably mounted on the retainer.

4 Claims, 5 Drawing Sheets

(56) References Cited

U.S. PATENT DOCUMENTS

| | | | | |
|---|---|---|---|---|
| 4,366,973 A | * | 1/1983 | Brekke | F16L 27/0828 |
| | | | | 285/276 |
| 4,481,755 A | * | 11/1984 | Carr | A01D 75/30 |
| | | | | 56/16.2 |
| 5,082,217 A | * | 1/1992 | Parker | F16L 3/003 |
| | | | | 248/75 |
| 5,232,330 A | * | 8/1993 | Rae | E02F 3/6273 |
| | | | | 414/686 |
| 5,490,470 A | * | 2/1996 | House | A01C 5/06 |
| | | | | 111/186 |
| 5,816,624 A | * | 10/1998 | Smith | F16L 27/0828 |
| | | | | 285/276 |
| 6,752,433 B2 | * | 6/2004 | Frost | F16L 27/0824 |
| | | | | 285/354 |
| 2009/0229501 A1 | | 9/2009 | Jaime et al. | |
| 2012/0139233 A1 | * | 6/2012 | Bohner | F16L 27/0828 |
| | | | | 285/272 |

FOREIGN PATENT DOCUMENTS

| | | |
|---|---|---|
| DE | 202012101626 U1 | 7/2012 |
| DE | 102011053800 A1 | 3/2013 |
| EP | 0836043 A1 | 4/1998 |

OTHER PUBLICATIONS

German Search Report issued in countepart application No. 102013221606.8, dated Jul. 21, 2014 (7 pages).

* cited by examiner

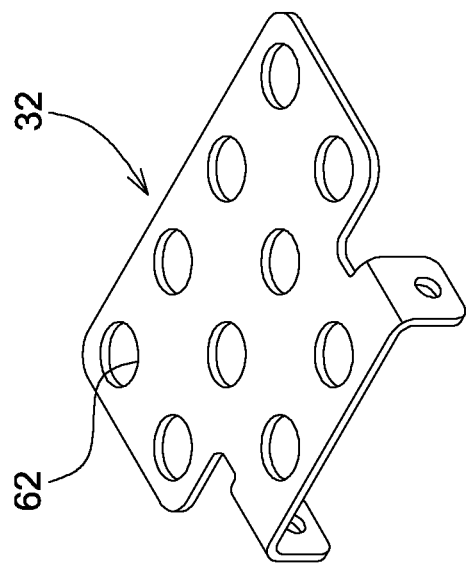
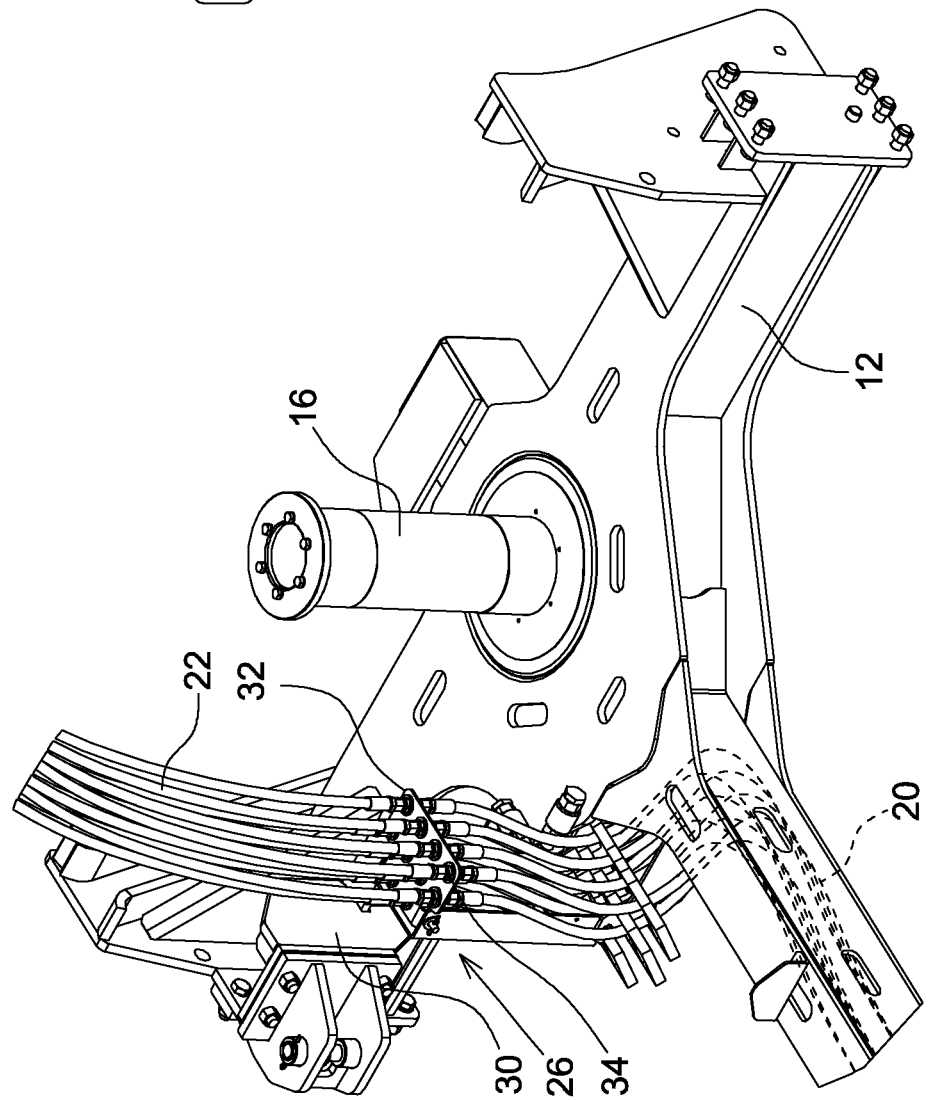

SUPPLY LINE CONNECTING DEVICE IN A FOLDABLE AGRICULTURAL MACHINE

BACKGROUND OF THE INVENTION

The invention relates to an agricultural machine comprising a first frame part and a second frame part pivotally arranged about a vertical shaft relative to the first frame part, comprising at least one first supply line which extends along the first frame part and at least one second supply line which extends along the second frame part, wherein a connecting device is provided, by means of which the at least first supply line and the at least second supply line are connected together.

Agricultural machines are known, in particular sowing machines or soil cultivation implements which have a frame construction, in which a first frame part is provided, a second frame part being mounted in an axially pivotable manner thereon. In this case, the first frame part may comprise a transport frame, wherein the second frame part comprises a carrier frame. Sowing units, planting units, soil cultivation implements, etc. may be attached to the carrier frame. In an operating position in which the carrier frame extends transversely to the transport frame, the agricultural machine has a width which extends beyond a permitted transport width and has to be moved into a corresponding transport position for transport on the road. To this end, the carrier frame may be initially lifted vertically and then pivoted by 90° about a vertical shaft relative to the transport frame, wherein the width of the agricultural machine is reduced many times. Supply lines, for example hydraulic and/or pneumatic pipes which ensure a hydraulic or pneumatic supply to the units and/or implements or actuators arranged on the carrier frame, extend on the transport frame and on the carrier frame. Generally, the ends of the supply lines are combined on the transport frame side and on the carrier frame side at a connecting device which firstly constitutes an interface for maintenance purposes and secondly serves for fastening and retaining the supply lines. When lifting and pivoting the frame parts from the transport position into the operating position and vice versa, the supply lines are correspondingly twisted and bent in the region of the connecting device and thus subjected both to radial and axial stress. This may lead, in particular, to the distortion of the supply lines, i.e. the twisting of the supply lines about the longitudinal axis thereof. Such distortion may significantly reduce the service life of the supply lines and should be avoided. Measures which provide the use of rotatable pipe connectors are known, so that the ends of the lines on the transport frame and the ends of the lines on the carrier frame are rotatably fastened to a connecting device. However, such rotatable pipe connectors are costly. In particular, with a high number of hydraulic supply lines on the agricultural machine, this may have a considerable impact on the overall production costs.

SUMMARY OF THE INVENTION

According to the invention, an agricultural machine of the type mentioned in the introduction comprises a connecting device with a retainer on which at least one rigid pipe connection is arranged for connecting the first and second supply lines, wherein the pipe connection comprises two connecting ends aligned axially relative to one another, between which a bearing disc is clamped, wherein the bearing disc is rotatably mounted on the retainer. The supply lines may be hydraulic and/or pneumatic and/or gas-filled supply lines. By clamping a bearing disc between the ends of a cost-effective rigid pipe connection and the rotatable mounting of the bearing disc on a retainer, a cost-effective and simple construction of a connecting device for hydraulic supply pipes, for example, may be provided, by which the distortion of the connecting lines may be effectively prevented or may be at least reduced.

The retainer may comprise a plate extending radially to the bearing disc, wherein the connecting ends of the pipe connection in each case extend perpendicular to the plate and wherein the bearing disc is gripped with clearance in a bore formed in the plate. In particular, the mounting of the bearing disc in the bore of a plate or the like represents a cost-effective variant which is able to be assembled in a simple manner and entirely avoids the use of rotatable pipe connectors.

The bearing disc may be gripped in a simple manner by retaining discs arranged on both sides of the plate, said retaining discs radially spanning a diameter of the bore, wherein the bearing disc is clamped between the retaining discs. Both the bearing disc and the retaining discs are of circular configuration and may be gripped with clearance in the bore so that the rotation of the bearing disc and thus also the rotation of the ends of the supply lines is possible. The retaining discs clamp the bearing disc and span the diameter of the bore such that the bearing disc is retained in an axially secure manner on the plate. In this case, the bearing disc is configured to be slightly thicker than the plate, whereby a certain axial clearance is provided between the retaining discs and the plate.

A shoulder and a thread may be formed on the pipe connection between the connecting ends, wherein the retaining discs and the bearing disc are clamped between a simple threaded nut guided on the thread and the shoulder. As a result, a particularly simple mounting of the connecting lines on the retainer is provided.

A plurality of bores arranged adjacent to one another may be formed on the plate, in each case a pipe connection being arranged therein by means of a bearing disc gripped in the respective bore. Thus a plurality of pipe connections may be fastened rotatably to the plate and/or to the retainer of a common connecting device.

The invention as well as further advantages and advantageous developments and embodiments of the invention are described and explained in more detail hereinafter with reference to the drawings which show an exemplary embodiment of the invention.

BRIEF DESCRIPTION OF THE DRAWINGS

FIG. 4 shows a schematic perspective view of a first frame part of the sowing machine of FIG. 1, FIG. 5 shows an enlarged schematic perspective view of a plate of a retainer configured on the first frame part and FIG. 6 shows an enlarged schematic side view of a pipe connection arranged in the plate according to FIG. 5.

DESCRIPTION OF THE PREFERRED EMBODIMENT

Figure 1:
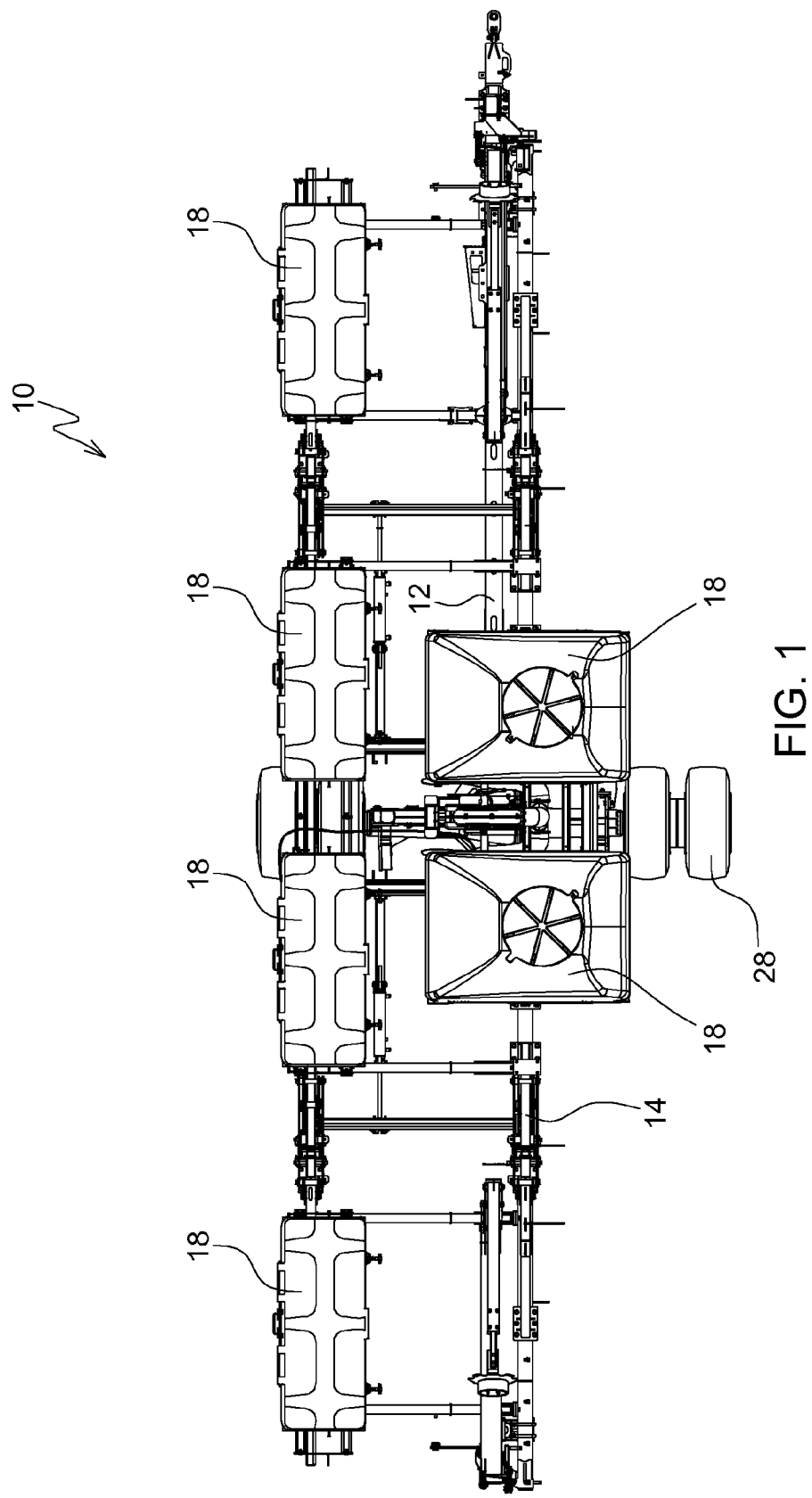
FIG. 1 shows a schematic plan view of a sowing machine in a transport position.
Figure 2:
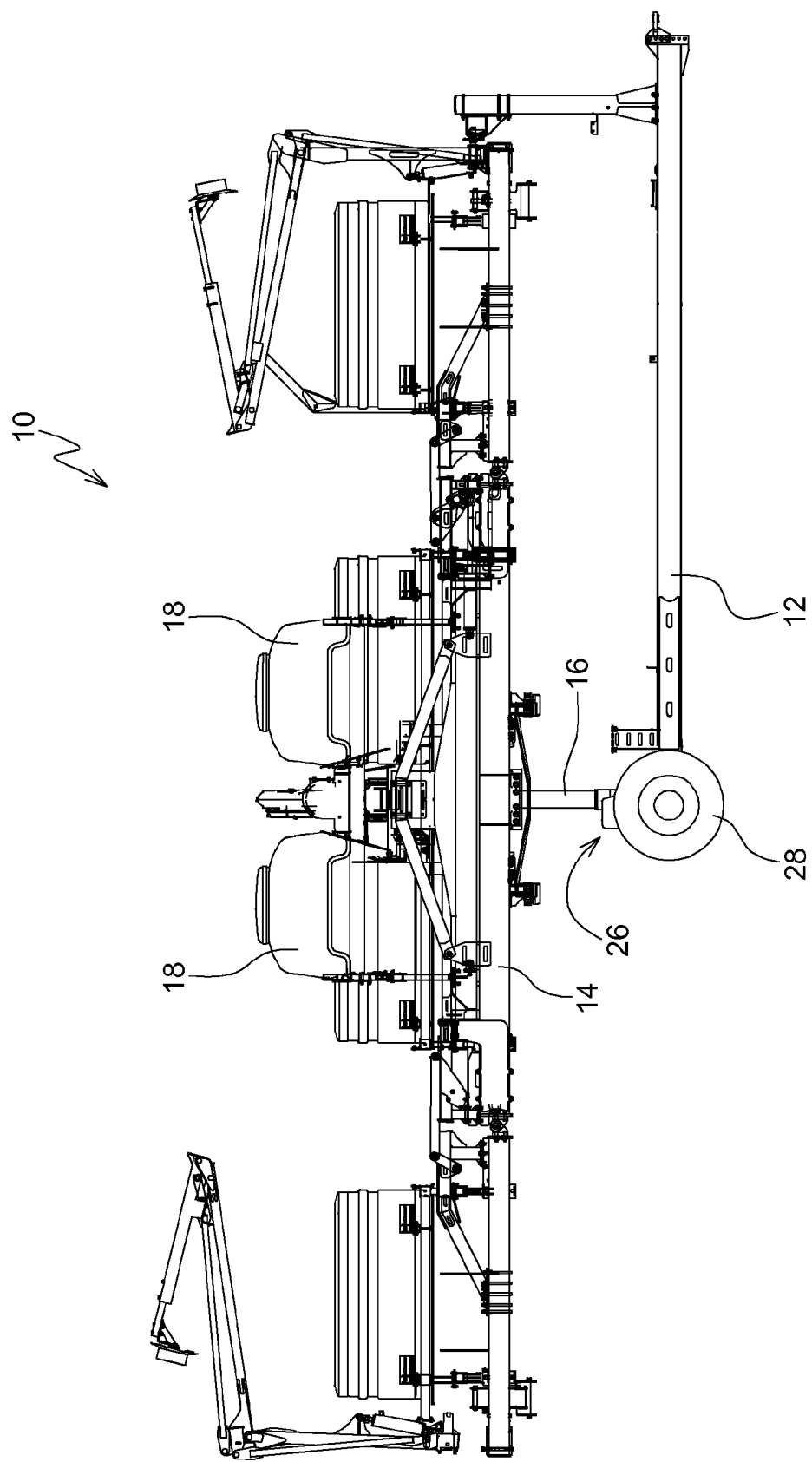
FIG. 2 shows a schematic side view of the sowing machine of FIG. 1 in the transport position.
Figure 3:
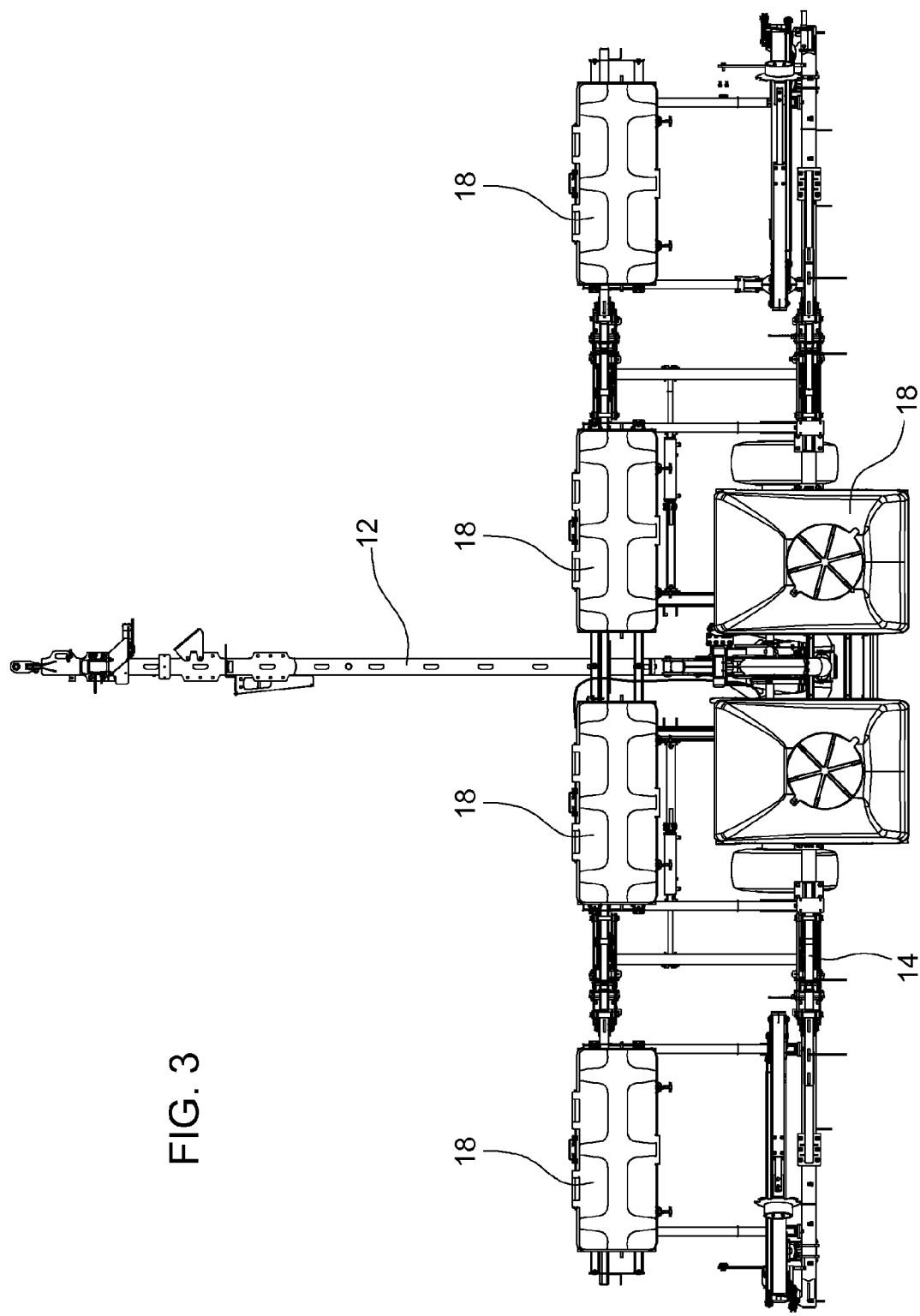
FIG. 3 shows a schematic plan view of the sowing machine of FIG. 1 in an operating position.

In FIGS. 1 to 3, an agricultural machine 10 in the form of a sowing machine is shown. The sowing machine comprises a first frame part 12 and a second frame part 14. The first frame part 12 is configured as a transport frame and the second frame part 14 is configured as a carrier frame. The second frame part 14 is pivotally mounted about a vertical shaft 16 arranged on the first frame part 12, wherein the second frame part 14 at the same time is mounted in a height-adjustable manner in the axial direction of the shaft 16. In this manner, the carrier frame mounted on the transport frame 12 may be pivoted and lowered from a transport position (according to FIG. 1 and FIG. 2) into an operating position (according to FIG. 3). Rows of sowing units (not shown) are mounted on the carrier frame, said sowing units being connected to seed hoppers and/or fertilizer tanks 18. For the hydraulic supply of the sowing machine, in particular for actuating hydraulic cylinders (not shown) on the carrier frame, first hydraulic supply lines 20 (FIG. 4) are arranged on the transport frame and second hydraulic supply lines 22 are arranged on the carrier frame. The first hydraulic supply lines 20 are able to be attached to a hydraulic source arranged on a towing vehicle (not shown), for example an agricultural tractor. The first hydraulic supply lines 20 extend on the transport frame 12 of the agricultural machine 10 to a connecting device 26 arranged on the transport frame 12. The second hydraulic supply lines 22 extend from the connecting device 26 along the carrier frame 14 to the respective hydraulic consumers, in particular the hydraulic cylinders (not shown). The connecting device 26 is preferably arranged on the transport frame. However, it is also possible to arrange said connecting device on the carrier frame. The transport frame 12 is supported by means of wheels 28 on the ground.

Figure 6:
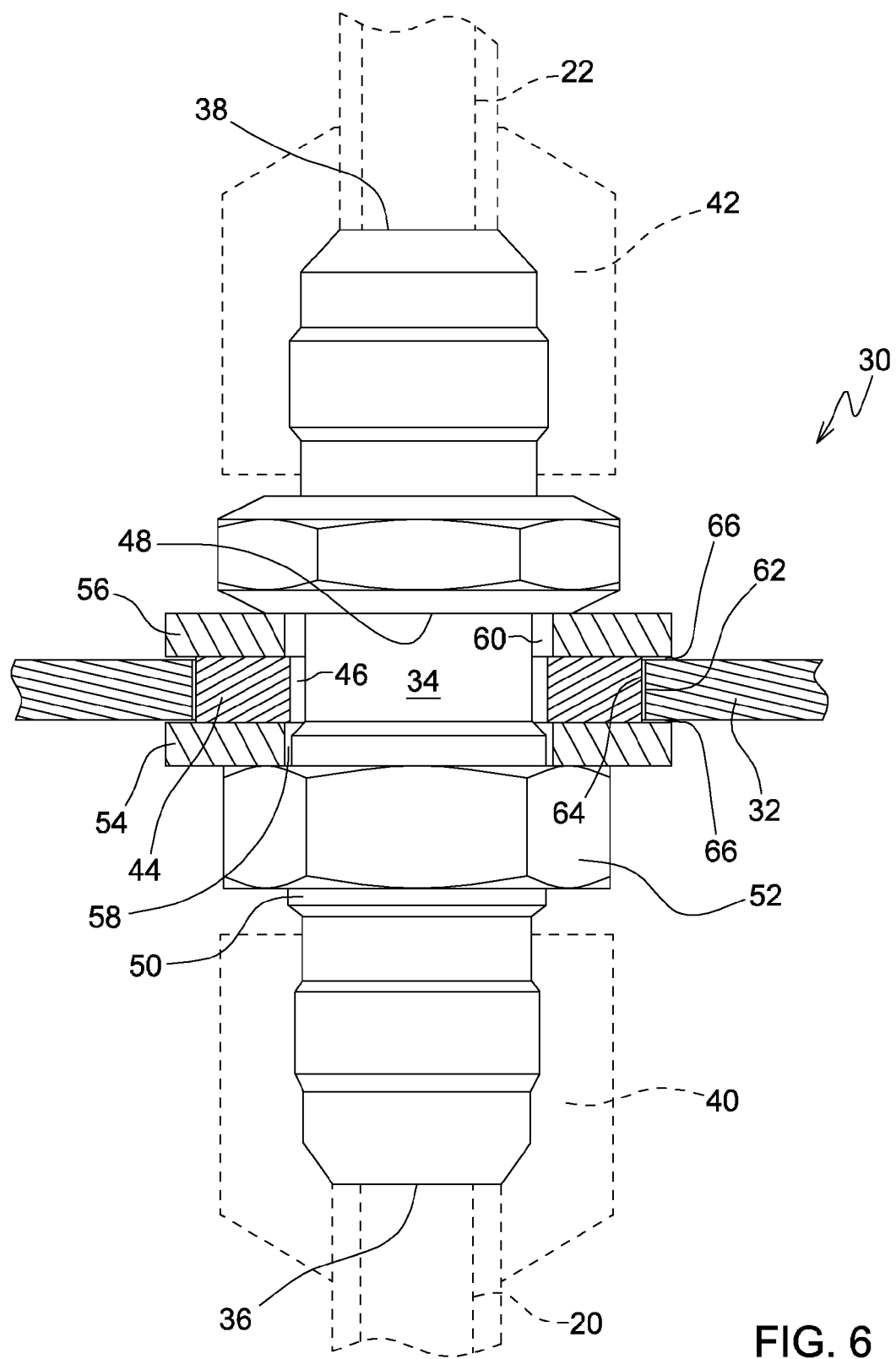

The connecting device 26 comprises a retainer 30 (FIG. 4) with a plate 32 (FIGS. 5 and 6). A plurality of intrinsically rigid pipe connections 34 are mounted on the retainer 30, said pipe connections serving to connect the first and second hydraulic supply lines 20, 22. The pipe connections 34 in each case have two connecting ends 36, 38 arranged opposite one another and axially aligned relative to one another, on which connecting bushes 40, 42 of the hydraulic supply lines 20, 22 are placed, wherein the pipe connections 34 are mounted so as to be aligned parallel to the shaft 16.

A bearing disc 44 is clamped between the connecting ends 36, 38 of each pipe connection 34. The bearing disc 44 is configured as a circular disc with a centrally configured through-opening 46 through which the pipe connection 34 extends (see FIG. 6). For clamping the bearing disc 44, between the connecting ends on the pipe connection 34 a shoulder 48 is formed on one side of the bearing disc 44 and a thread 50 is formed on the other side of the bearing disc 44, a threaded nut 52 being guided on said thread. Moreover, a retaining disc 54, 56 is arranged in each case on both sides of the bearing disc 44, said retaining disc in each case being configured as a circular disc and also being provided with a centrally configured through-opening 58 and/or 60 through which the pipe connection 34 extends. As may be derived from FIG. 6, the bearing disc 44 is gripped between the retaining discs 54 and 56 and the retaining discs 54, 56 are clamped between the shoulder 48 and the threaded nut 52, wherein one retaining disc 56 comes to bear against the shoulder 48 and the other retaining disc 54 comes to bear against the threaded nut 52. The external diameters of the retaining discs 54, 56 are dimensioned such that in each case they extend beyond the external diameter of the bearing disc 44.

The plate 32 is provided with a plurality of bores 62 on which in each case one of the pipe connections 34 is mounted, wherein the bores 62 are configured as through-bores. One of the bores 62 and a corresponding mounting of a pipe connection 34 is detailed by way of example in FIG. 6. The plate 32 is arranged such that the connecting ends 36, 38 of the pipe connection 34 in each case extend perpendicular to one side of the plate 32, wherein a bearing disc 44 is gripped with clearance in the respective bore 62 thereof configured in the plate 32. To this end, the thickness of the bearing disc 44 is configured to be greater than the thickness of the plate 32 and the diameter of the bearing disc 44 less than the diameter of the bore 62. Additionally, the diameter of the retaining discs 54, 56 is selected to be greater than the diameter of the bore 62 so that the retaining discs 54, 56, on the one hand, protrude beyond the bearing disc 44 and, on the other hand, also protrude beyond the bore 62 of the plate 32. This results in the bearing disc 44 being gripped with clearance, wherein a radial gap for movement 64 is formed between an edge of the bore 62 and an edge of the bearing disc 44 and in each case an axial gap for movement 66 is formed between the retaining discs 54, 56 and the plate 32. Thus the bearing disc 44 is rotatably mounted on the retainer 30, wherein the plate 32, as shown, extends radially to the bearing disc 44 and a freedom of movement of the pipe connection 34 is limited in the axial direction by the retaining discs 54, 56 and in the radial direction by the bore 62.

By means of the connecting device 26 for hydraulic supply lines 20, 22, set forth above, it is possible that by using conventional rigid pipe connections 34 a type of rotary connection is provided for the hydraulic supply lines 20, 22 by simple means, without having to have recourse to conventional rotatable pipe connectors. As is shown by way of example in FIG. 5, in the above exemplary embodiment a retainer with ten bores 62 formed in the plate 32 is proposed for mounting ten rigid pipe connections 34 and/or for connecting ten hydraulic supply lines 20 on the first frame part 12 to ten hydraulic supply lines 22 on the second frame part 14. This may naturally be varied and may be altered as required to a higher or lower number. By mounting the bearing discs 44 and thus the pipe connections 34 with clearance, a radial freedom of movement of the hydraulic supply lines 20, 22 is improved and/or increased such that the hydraulic lines 20, 22 are prevented from being distorted when the first frame part 12 (transport frame) is pivoted relative to the second frame part 14 (carrier frame) from a transport position into an operating position. As a result, the hydraulic supply lines 20, 22 are subjected to considerably less torsional stress (twisting) and the service life extended.

Whilst the invention has been described merely with reference to one exemplary embodiment, in view of the above description and the drawings, many different types of alternatives, modifications and variants which fall within the scope of the present invention are deduced by the person skilled in the art. Thus, for example, a similar connecting device 26 may also be provided for pneumatic or other supply lines filled with a fluid or gas.

Having described the preferred embodiment, it will become apparent that various modifications can be made without departing from the scope of the invention as defined in the accompanying claims.

The invention claimed is:

1. An Agricultural machine comprising:
a first frame part and a second frame part pivotally mounted to the first frame part about a vertical shaft relative to the first frame part; and
at least one first supply line which extends along the first frame part and at least one second supply line which extends along the second frame part, wherein a connecting device is provided, by means of which the at least one first supply line and the at least one second supply line are connected together, wherein the connecting device includes a retainer on which at least one rigid pipe connection is arranged for connecting the first and second supply lines, wherein the pipe connection has two connecting ends aligned axially relative to one another, between which a bearing disc is clamped, wherein the bearing disc is rotatably mounted on the retainer wherein the retainer comprises a plate extending radially to the bearing disc and the connecting ends of the pipe connection in each case extend perpendicular to one side of the plate, wherein the bearing disc is gripped with clearance in a bore formed in the plate.

2. Agricultural machine according to claim 1, wherein the bearing disc is gripped by retaining discs arranged on both sides of the plate, said retaining discs radially spanning a diameter of the bore, wherein the bearing disc is clamped between the retaining discs.

3. Agricultural machine according to claim 2, wherein a shoulder and a thread are formed on the pipe connection between the connecting ends, wherein the retaining discs and the bearing disc are clamped between a threaded nut guided on the thread and the shoulder.

4. Agricultural machine according to claim 1 wherein a plurality of bores arranged adjacent to one another are formed on the plate, and a pipe connection is mounted by means of a bearing disc gripped in the respective bore.

* * * * *